Keely & Cressman,
Hydraulic Engine,

Nº 25,741.  Patented Oct. 11, 1859.

Witnesses  
Chas Davis  
David W. Harry

Inventor  
Miles Keely  
G. W. Cressman

UNITED STATES PATENT OFFICE.

M. KEELEY AND G. W. CRESSMAN, OF BARREN HILL, PENNSYLVANIA.

HYDRAULIC MOTOR.

Specification of Letters Patent No. 25,741, dated October 11, 1859.

*To all whom it may concern:*

Be it known that we, MILES KEELEY and G. W. CRESSMAN, both of Barren Hill, in the county of Montgomery and State of Pennsylvania, have invented a new and Improved Hydraulic Engine; and we do hereby declare that the following is a full, clear, and exact description of the same, reference being had to the annexed drawings, making a part of this specification, in which—

Figure 1:
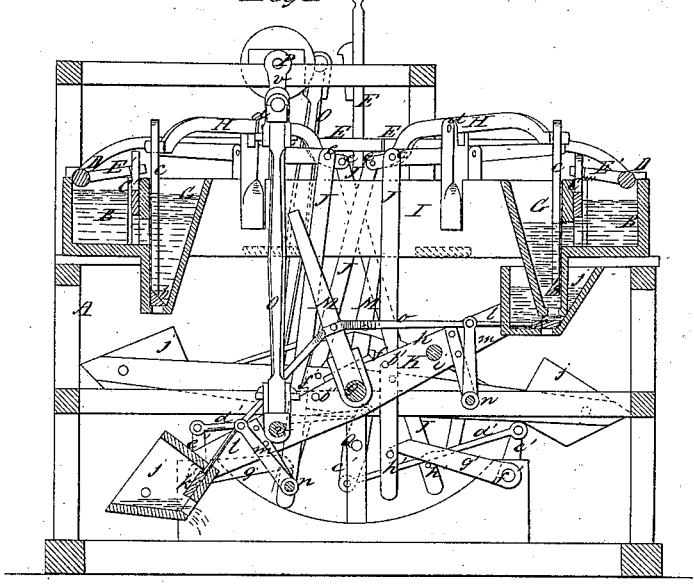
Figure 2:
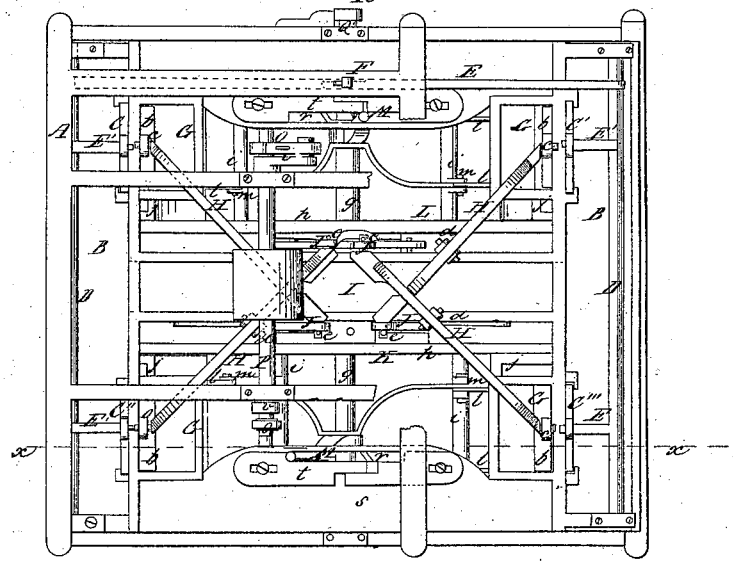

Figure 1, is a side sectional view of our invention, taken in the line $x$, $x$, Fig. 2. Fig. 2, is a plan or top view of ditto.

Similar letters of reference indicate corresponding parts in the two figures.

To enable those skilled in the art to fully understand and construct our invention we will proceed to describe it.

A, represents a rectangular framing which may be constructed in any proper way to support the working parts.

B, B, are two penstocks at the upper part of the framing, each penstock being provided with two gates C, C′, and C″ C‴. These gates are opened and closed and adjusted at any desired point by shafts D, D, and arms or levers E, attached thereto, the inner ends of the latter being connected to a vertical adjustable slide F, in the framing. The shafts D, D, are connected with the gates C, C′, C″, C‴, by arms E′.

To the inner side of each penstock B, two boxes G, G, are attached. These boxes are placed over the gates C, C′, C″, C‴, and when the latter are raised the boxes G, communicate with the penstocks. The boxes G, are each provided with a gate $b$, and these gates form the bottoms of the boxes and rise and fall therein, so as to open and close as shown clearly in Fig. 1.

The gates $b$, have each a vertical rod $c$, attached to them and these rods are connected at their upper ends to levers H, the fulcra $d$, of which are attached to a trough I, which forms a communication between the two penstocks, as shown plainly in Fig. 2. It will be seen by referring to this Fig. 2, that two of the boxes G, are at one side of the trough I, and two at the other side and that the levers H, at one side of the trough cross those at the other side.

The outer ends of the levers H, are connected by pins $a$, to pendent rods J, one to each, and the lower part of each rod J, has a notch $f$, made in it as shown clearly in Fig. 1.

In the lower part of the framing A, two lever frames K, L, are placed on shafts $g$. These frames are formed each of two parallel bars $h$, $h$, connected by proper traverse pieces $i$, and have a bucket $j$, at each end. Each bucket $j$, is provided with a sliding bottom $k$, which is connected by rods $l$, $l$, to the upper ends of arms $m$, $m$, which are attached to a rock shaft $n$, below its frame, see Fig. 1. The upper ends of the arms $m$, $m$, of each lever frame are connected by rods $o$, to a lever M, the lower end of which is fitted loosely on the shaft $g$, of its frame, the upper parts of said levers working in slots $r$, made in longitudinal strips $s$, in the framing and over each of which an adjustable slotted or recessed bar $t$, is placed to vary the length of said slots. The object of this will be presently explained. The bars $t$, and the slots $r$, $r$, in the strips $s$, are plainly shown in Fig. 2.

Each lever frame K, L, is connected by a pitman O, to a crank shaft P, on the upper part of the framing A. The cranks $v$, $v$, $v$, of the shaft P, are placed nearly at right angles to each other so that the two lever frames K, L, will work simultaneously in opposite directions or nearly so, it being designed to have the two frames coincide in movement for a short time just previous to each change of stroke in order to render the speed of the shaft P, as constant as possible.

The rods J, pass above through guide slots $a$, at the inner sides of the lever frames K, L, and pins $b′$, which are in said slots catch into the notches $f$, as the pins of each lever frame descends.

In the lower part of the framing A, a shaft Q, is placed transversely. This shaft has a lever R, on its outer end, and a cross head $c′$, on its end, said cross head having a rod $d′$, attached to each end of it the outer end of each rod $d′$, being connected to arms $e′$, on shafts $f′$, which are fitted in proper bearings on the base of the framing. On the outer end of each shaft $f′$, there is an arm $g′$, and to the lower part of each rod J, a pin $h′$, is attached.

The operation is as follows:—When it is designed to start the engine, the operator opens the gates C, C′, C″, C‴, and the water flows into the boxes G, and from thence into the buckets $j$, and actuates the lever frames K, L, one rising as the other falls and thereby giving a rotary motion to the shaft P, in consequence of the connection formed by the pitman O, and cranks v. It will be seen that in order for the water to thus actuate the frames K, L, it must be let intermittingly into their buckets and discharged therefrom at the proper time. This is effected by the operation of the gates b, of the boxes G, the gates b, being raised and consequently opened as their rods J, are forced down by the pins b', catching into the notches f, and the rods J, are thereby actuated by the pin at the descending end of one lever frame to open the gate b, over the adjoining elevated end of its fellow frame, one lever frame actuating the gates that admit the water into the buckets of the other, hence, the object of having the levers H, cross each other. The gates b drop and close by their own gravity as soon as the pins b', slip out of the notches f, of the rods J.

Just previous to each bucket reaching the lowest point of its descent its bottom k, is withdrawn or opened so as to permit the water to escape and allow the filled or filling bucket at the opposite end to descend. The bottoms k, are operated by the levers M, in connection with the movement of the lever frames K, L, the levers M, being arrested or held by the ends of the slots r, the length of which may be regulated as desired by adjusting the bar t, when the lever frames reach a certain point in their movement, the movement of the latter actuating through the medium of the rock shaft n, and arms e', the bottoms k. It will be seen that the levers M, may be arrested sooner or later by adjusting the bar t, and the movement of the bottoms k, thereby regulated as desired.

When necessary all the gates b, may be retained in an open state in order to check the machine instantly or to prevent its casual movement by leakage of the gates C, C', C'', C'''. This is effected by actuating the lever R, so as to throw the arms g', over the pins h', of the rods J, and thereby keep the rods J, depressed and the gates b, elevated.

We do not claim broadly the employment of water holders with valves, at the extremities of levers, for the purpose of obtaining motive power, for we are aware that such contrivances have long been known, but

Having thus described our invention we claim as new and desire to secure by Letters Patent,

The arrangement and combination with the levers M, lever frames K, L, and bottoms (k) of the adjustable slots (r) and bars (t) which the speed of the machine, length of stroke of the levers and distance of water may be regulated at pleasure as herein shown and described.

MILES KEELEY.
G. W. CRESSMAN.

Witnesses:
 CHAS. DAVIS,
 DAVID W. HARRIS.